US012399807B2

(12) United States Patent
Drebing et al.

(10) Patent No.: US 12,399,807 B2
(45) Date of Patent: Aug. 26, 2025

(54) CANDIDATE PROGRAM RELEASE EVALUATION

(71) Applicant: HERE ENTERPRISE INC., New York, NY (US)

(72) Inventors: Ben Drebing, New York, NY (US); Chuck Doerr, New York, NY (US)

(73) Assignee: Here Enterprise Inc., New York, NY (US)

( * ) Notice: Subject to any disclaimer, the term of this patent is extended or adjusted under 35 U.S.C. 154(b) by 133 days.

(21) Appl. No.: 17/409,187

(22) Filed: Aug. 23, 2021

(65) Prior Publication Data

US 2022/0066917 A1 Mar. 3, 2022

Related U.S. Application Data

(60) Provisional application No. 63/070,152, filed on Aug. 25, 2020.

(51) Int. Cl.
| | | |
|---|---|---|
| *G06F 11/36* | (2025.01) | |
| *G06F 8/61* | (2018.01) | |
| *G06F 9/445* | (2018.01) | |
| *G06F 11/3668* | (2025.01) | |

(52) U.S. Cl.
CPC ............ *G06F 11/3688* (2013.01); *G06F 8/61* (2013.01)

(58) Field of Classification Search
CPC ............ G06F 11/3686; G06F 11/3668; G06F 11/3692; G06F 11/3604; G06F 11/3612; G06F 11/079; G06F 11/22; G06F 11/36; G06F 11/08; G06F 8/61
See application file for complete search history.

(56) References Cited

U.S. PATENT DOCUMENTS

| | | | | |
|---|---|---|---|---|
| 9,146,720 B1 * | 9/2015 | McGilliard | ............... | G06F 8/60 |
| 10,585,656 B1 * | 3/2020 | Das | ............... | G06F 8/61 |
| 10,635,566 B1 * | 4/2020 | Talluri | ............... | G06F 9/4488 |
| 10,936,468 B1 * | 3/2021 | Ochlak | ............... | G06F 8/75 |
| 10,956,242 B1 * | 3/2021 | Kumar | ............... | G06F 8/76 |

(Continued)

FOREIGN PATENT DOCUMENTS

EP 3579101 A2 12/2019

OTHER PUBLICATIONS

International Search Report and Written Opinion on the Patentability of Application No. PCT/US2021/047298 Mailed Dec. 13, 2021, 18 pages.

(Continued)

*Primary Examiner* — S. Sough
*Assistant Examiner* — Mohammad H Kabir
(74) *Attorney, Agent, or Firm* — Womble Bond Dickinson (US) LLP

(57) ABSTRACT

A computing system may implement a content delivery system to communicate to a plurality of client devices an indication to install a candidate program. The indication causes each client to download and execute the candidate program in a health-check mode to execute a health-check. Each client device executes the candidate program in health-check mode that includes one or more compatibility tests to generate a result associated with the one or more compatibility tests. The client device generates a test report associated with the results to upload to the content delivery system for analysis.

20 Claims, 6 Drawing Sheets

(56) References Cited

U.S. PATENT DOCUMENTS

| | | | | |
|---|---|---|---|---|
| 2014/0325282 A1* | 10/2014 | Wu | ............... | G06F 11/3676 |
| | | | | 714/38.1 |
| 2016/0162275 A1* | 6/2016 | Morley | ............... | H04L 67/02 |
| | | | | 717/170 |
| 2017/0115978 A1* | 4/2017 | Modi | ............... | G06F 8/65 |
| 2019/0034320 A1* | 1/2019 | Stokes | ............... | G06F 11/3692 |
| 2020/0183806 A1* | 6/2020 | Lin | ............... | G06F 11/3414 |
| 2020/0293496 A1* | 9/2020 | Arakawa | ............... | G06F 16/1734 |

OTHER PUBLICATIONS

Smart John Ferguson: "Jenkins The Definitive Guide", Jan. 1, 2011, 417 pages.
Andrew Pavlo et al: "The NMI Build & Test Laboratory: Continuous Integration Framework for Distributed Computing Software", Usenix, The Advanced Computing Systems Association, Feb. 25, 2019, 11 pages.
Singh Charanjot et al: "Comparison of Different CI/CD Tools Integrated with Cloud Platform", 2019 9th International Conference on Cloud Computing, Data Science & Engineering (Confluence), Jan. 10, 2019, 6 pages.
Birk Alexander et al: "Eine Einfuhrung in Continuous Delivery, Teil 3: Acceptance Test STage", Nov. 14, 2014, 10 pages.
European Patent Office; Office Action issued for Application No. EP 21773676.8 dated Aug. 2, 2024; 11 pages.

* cited by examiner

CANDIDATE PROGRAM RELEASE EVALUATION

RELATED APPLICATION

This application claims the benefit under 35 U.S.C. § 119(e) of U.S. Provisional Application Ser. No. 63/070,152, filed Aug. 25, 2020, the disclosures of which is incorporated herein by reference in its entirety.

BACKGROUND

Conventional networked client computer systems of an organization are often a mix of various operating systems, processor types, and component configurations, and further include a multitude of applications that may be installed locally or hosted by an external source, such as cloud based application management systems. Even when installed locally the applications are managed by and routinely updated by the application management system, often through an agent application running on the client device. As the number of networked computer systems grow in an organization so do compatibility issues related to installing updated applications.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
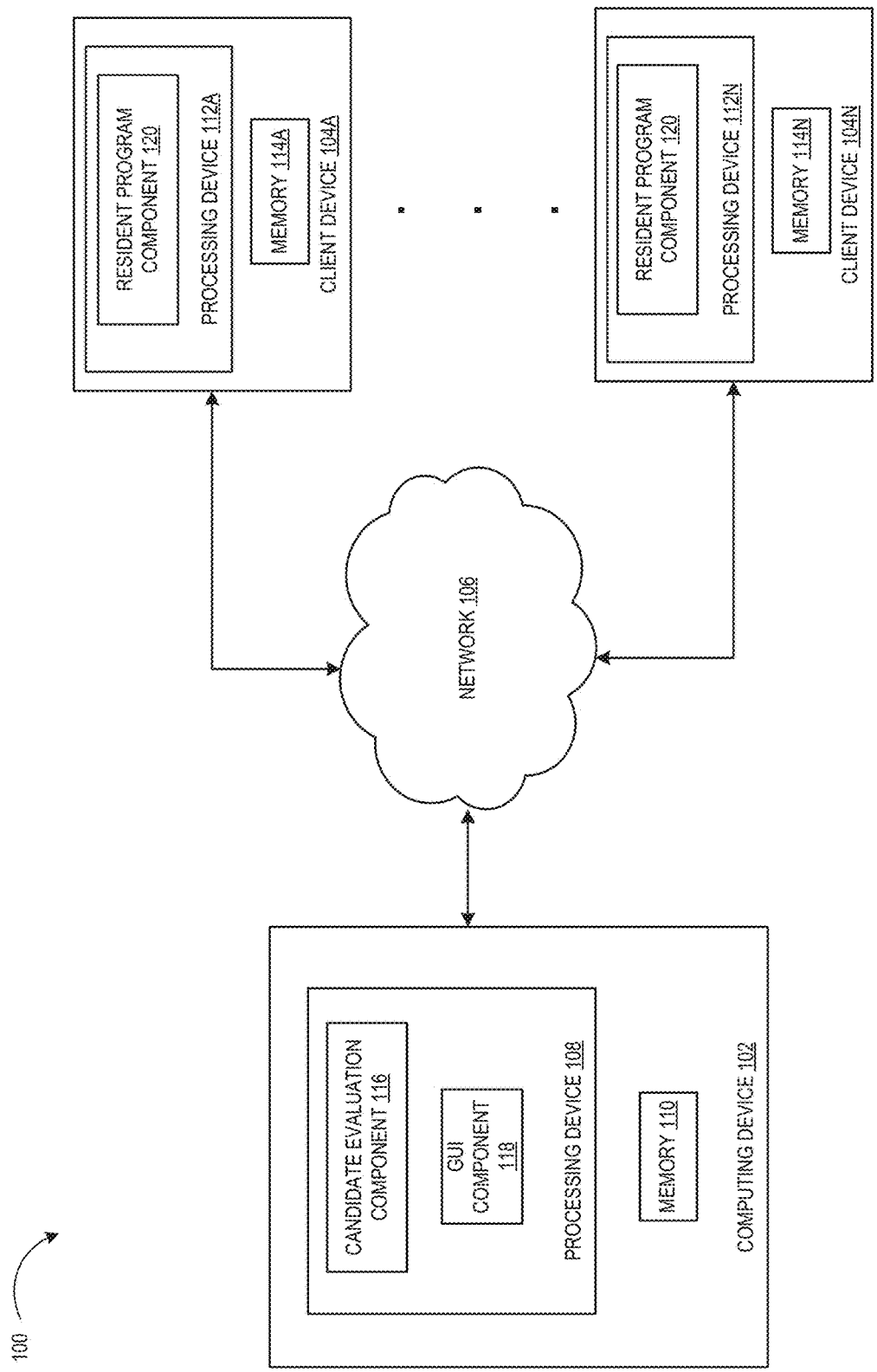
FIG. 1 is a block diagram that illustrates an example of a content delivery system.

Software applications often are deployed remotely to and installed or run on client computer systems. Remote deployment allows the distributor of the application to release a new version of the application to multiple client computer systems, such as a companywide rollout of a new version of the application. However, due the variance in complexity and security configurations of computer systems, such as varying operating system types, hardware configurations, firewall and security software, etc., there may be compatibility issues with the new or different version causing instability in at least some if not all of the client computer systems. This instability may lead to computer system crashes, loss of data, and loss of productivity during and after the program (software) release. Conventional solutions to test the compatibility of a release include release testing in a lab by trying to replicate the end user environment on a client device or devices, or creating a randomized trial on actual client devices that includes a phased rollout where only a fraction of the client devices receive the release version (e.g., application update), and users of the client devices report back the results (e.g., system failure, instability, success, etc.).

In the case of lab testing, it is impossible to replicate the complexities, as detailed above, of every client device in the lab. For example, some software bugs are caused by factors specific to a client device that a developer is not aware of or cannot reproduce during software testing in the lab. Thus, when releasing a new version of the program, these hidden bugs are only found when a user of the client device encounters the bug and reports it back to the software developer, which is inefficient and costly in terms of loss of productivity and time for the user and the developer.

A phased rollout or A/B testing uses actual client devices but is very inefficient as to avoid organization wide computer system instability has to be rolled out very slowly across the organization. For example, if the number of failures is within an acceptable number another fractional rollout is executed, and so on, until attempted on all client computer devices. If the number of failures is too high, the affected client devices are restored, the release version is recalled, updated and a new phased rollout begins and the process repeats. Similar to the lab testing example, the software bugs are also only found when a user of the client device encounters the bug and reports it back to the software developer.

Aspects of the present disclosure remedy the above and other deficiencies by utilizing a content delivery system to provide a candidate program representing the new version of the application software or program to the client computer systems. In embodiments, the content delivery system may communicate to the client devices an indication to install a candidate program. The indication causes the client to download and execute the candidate program in a health-check mode to execute a health-check. Each client device executes the candidate program in health-check mode that includes one or more compatibility tests to generate results associated with the one or more compatibility tests. The client device generates a test report based on the results of the one or more compatibility tests for uploading to the content delivery system. Because the health-check mode operates in isolation and in the background with respect to a user of the client computer system, the risk of creating instability that may lead to computer system crashes, loss of data, and loss of productivity may be avoided.

In one embodiment, the content delivery system receives, from each of the client devices, according to one embodiment, each test report to analyze to determine which are compatible client devices with the candidate program and which are incompatible client devices with the candidate program. In one embodiment, this includes mapping each cause of failure to each respective client device type and configuration that may include platform type (e.g., desktop, mobile), operating system type, security software, operating system version, processor type, and the like. The content delivery system, according to one embodiment, analyzes pass data for each test report of the compatible client devices and generates a user interface to display the pass data and the fail data. The content delivery system may communicate to the compatible client devices an indication to install the candidate program in a runtime mode when a number of compatible client devices exceeds a threshold value. In another embodiment, the content delivery system receives an install indication from a client device that the candidate program was automatically installed in a runtime mode when the client device passed the health-check. By analyzing the report data and updating only the system that pass the health-check an organization can avoid the trial and error process of rolling out the new candidate program to only a fraction of the total client devices, avoid causing instability in some or all of the client devices and loss of productivity, and reduce or eliminate the repeated phased rollouts when the candidate program fails and requires modification. Additionally, because the content delivery system has determined which systems have passed the candidate program may be released to all the passing systems without a trial and error phased approach and greatly increase rollout efficiency and reduce costs.

FIG. 1 depicts a high-level component diagram of an illustrative example of a content delivery system 100, in accordance with one or more aspects of the present disclosure. One skilled in the art will appreciate that other architectures for a content delivery system 100 are possible, and that the implementation of a computer system utilizing examples of the invention are not necessarily limited to the specific architecture depicted by FIG. 1.

FIG. 1 is a block diagram that illustrates an example of a content delivery system 100, in accordance with one or more aspects of the present disclosure. The content delivery system 100 may include a computing device 102 and one or more client devices, such as client devices 104A to 104N. For simplicity, only one computing device is illustrated, however, there may be more or less implemented in other embodiments of the content delivery system 100. Network 106 may be a public network (e.g., the internet), a private network (e.g., a local area network (LAN) or wide area network (WAN)), or a combination thereof. In various embodiments, the network 106 may include a wired or a wireless infrastructure, such as a WiFi' hotspot connected with the network 106, and/or a wireless carrier system that can be implemented using various data processing equipment, communication towers (e.g. cell towers), etc. In embodiments, the network 106 may utilize any protocol or combination of protocols for communicating between the computing device 102 and client devices 104A to 104N, such as Ethernet, internet protocol (IP), etc. The content delivery system 100 may be a cloud-based service, on an organization's network, a stand-alone on a desktop, or at any other location connectable to one or more client devices, such as client devices 104A to 104N.

The computing device 102 may include hardware such as processing device 108, memory 110, and other hardware devices (e.g., sound card, video card, etc.) (not shown). Similarly, each of the client devices 104A to 104N may include hardware such as processing devices 112A to 112N, and respective memories 114A to 114N, and other hardware devices (e.g., sound card, video card, etc.) (not shown). The processing device 108 and 112A to 112N, and the memories 110 and 114A to 114N may be any one or combination of processing devices and memories discussed below with respect to FIG. 6. In an illustrative example, processing device 108 or processing devices 112A to 112N may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 108 or processing devices 112A to 112N may also include one or more special-purpose processing devices such as an application specific integrated circuit (ASIC), a field programmable gate array (FPGA), a digital signal processor (DSP), network processor, or the like.

Each computing device 102 and client devices 104A to 104N may include any suitable type of computing device or machine that has one or more processing devices (e.g., processing device 108) including, for example, server computers, desktop computers, laptop computers, tablet computers, smartphones, set-top boxes, etc. In some examples, each computing device 102 may comprise a single machine, virtual machines running on one or more machines, or may include multiple interconnected real or virtual machines (e.g., multiple nodes in a cluster). The computing device 102 and client devices 104A to 104N may be implemented by a common entity or may be implemented by different entities. For example, computing device 102 may be operated by a first entity and one or more and client devices 104A to 104N may be operated by a second entity.

Each computing device 102 may include a candidate evaluation component 116 and a graphical user interface (GUI) component 118, and each client device 104A to 104N may further include a resident program component 120A and 120N, respectively. In one embodiment, each resident program component 120A to 120N may communicate with the candidate evaluation component 116 and further may receive an indication transmitted from the candidate evaluation component 116 through the network 106 to download and install a candidate program (e.g., candidate program component 204 of FIG. 2) to run in a health-check mode to determine compatibility with each of client device 104A to 104N. In one embodiment, after compatibility is determined a test report (e.g., test report 208 of FIG. 2) may be generated by the resident program component 120A to 120N of each client device and uploaded to the candidate evaluation component 116 for analysis and results may be processed by the GUI component 118 to create test data (e.g., test data 210 of FIG. 2). The test data may be displayed on a GUI (e.g., GUI 500 of FIG. 5) associated with the computing device 102 of the content delivery system 100. In various embodiments, a user of computing device 102 may interact with the GUI to determine which of the client devices 104A to 104N are to receive the indication to install the candidate program in a runtime mode and which of the client devices 104A to 104N that require a modified candidate program to address each system's incompatibility issue. In another embodiment, the indication to install the candidate program in a runtime mode is transmitted automatically without user intervention based on the results of the analyzed test reports by the candidate evaluation component 116.

Figure 2:
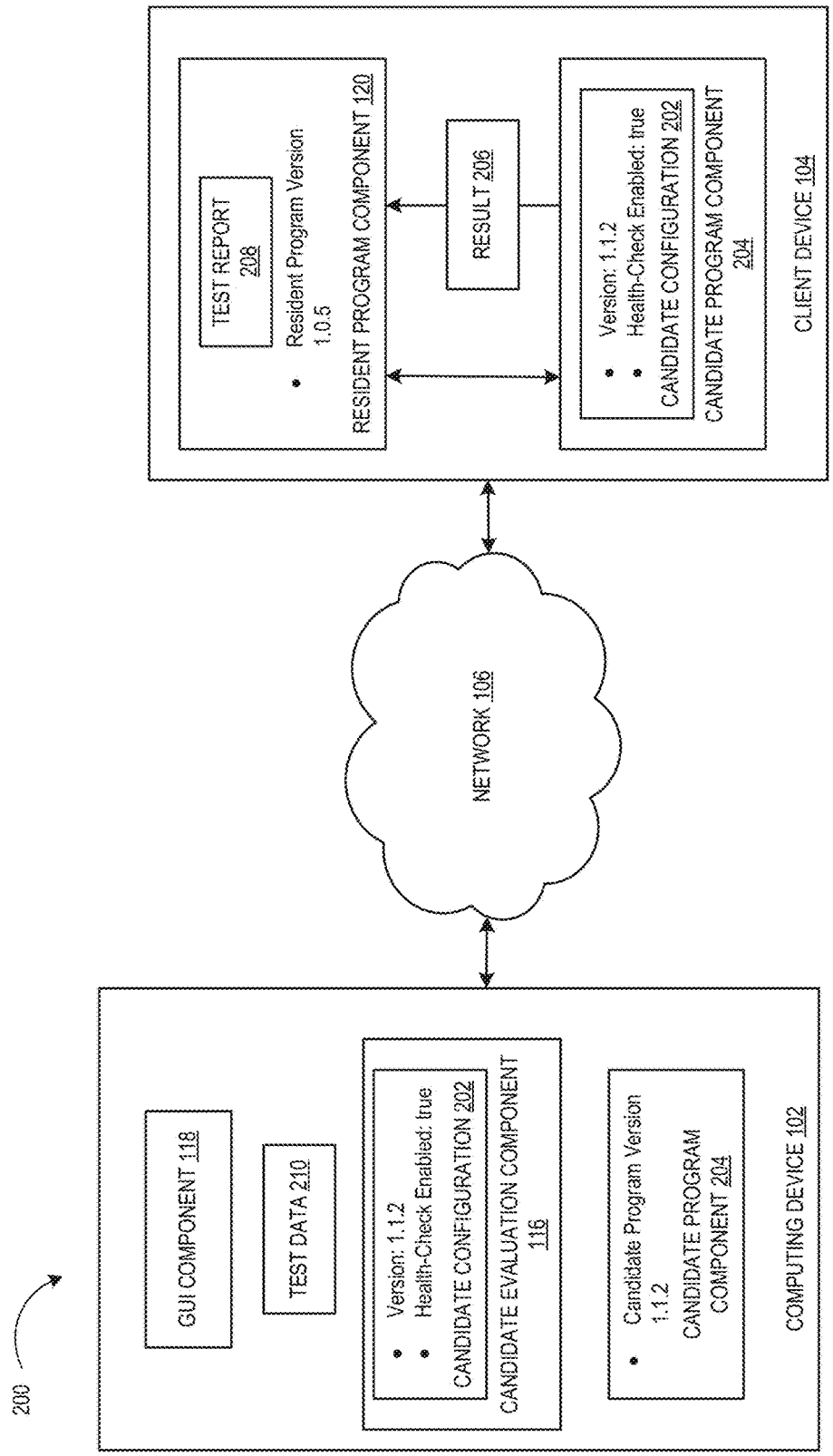
FIG. 2 is a block diagram that illustrates an example of a content delivery system for initiating, testing and releasing a candidate program to client devices.

FIG. 2 is a block diagram that illustrates an example of a content delivery system 200 for initiating, testing and releasing a candidate program to client devices. Content delivery system 200 may include one or more computing devices such as those described with respect to FIG. 1 (e.g., processing devices 108 and 112A to 112N). For simplicity and clarity, only one client device 104 is shown and other system components (e.g., memories) are not shown in FIG. 2. As illustrated here, content delivery system 200 includes, according to one embodiment, the computing device 102, network 106, and a client device 104. The computing device 102 includes the candidate evaluation component 116, a candidate configuration 202, GUI component 118, and a candidate program component 204. The client device 104 includes the resident program component 120, a candidate program component 204, a result 206, and a test report 208.

The resident program component 120, according to one embodiment may be configured to receive an indication transmitted from the candidate evaluation component 116 to download and install the candidate program component 204. For example, the candidate evaluation component 116 may communicate the candidate configuration 202 to the resident program component 120 that provides the indication data that the candidate program component to download is version 1.1.2 and that the health-check mode is enabled. In one embodiment, the candidate evaluation component 116 including the candidate configuration 202 is pushed down to the resident program component 120 to initiate the process. In another embodiment, the resident program component 120 may periodically check the candidate evaluation component 116 to determine if a candidate evaluation component 116 is available to download and test in the health-check mode.

In one embodiment, the resident program component 120 launches the downloaded candidate program component 204 in the health-check mode to determine whether the client device 104 is compatible with the candidate program component 204. The candidate program component 204 may be, according to one embodiment, downloaded, extracted, and launched on the client device 104 in isolation to and in the background with respect to the current state and processes, and thus may be invisible and have no impact on the user of the client device (e.g., client device 104). In one example, health-check mode may test network access to key uniform resource locators (URLs) (e.g., an endpoint for license verification and reporting) and any hypertext transfer protocol (http) status codes produced if it fails. (e.g., see 1-5 in health check failures 504 of FIG. 5). In another example, health-check mode may test Read/Write access to important file system locations (e.g., location for storing log files or asset files) and provide any error codes produced (e.g., see 8-9 in health check failures 504 of FIG. 5). As described herein, these and other tests may run as an isolated process (e.g., candidate program 204 of FIG. 2) as to not impact the normal function of the resident program (e.g., resident program component 120 of FIG. 2).

In one embodiment, candidate program component 204 generates result 206. Result 206 may include some or all of a pass/fail for each test performed, numerical or text data associated with each test, client device hardware, software, driver, and firmware information, and other configuration information. The result 206 may then be communicated to the resident program component 120 to create a test report 208. In various embodiments, the test report 208 from each client device under test may be uploaded through network 106 to the candidate evaluation component 116 for further analysis and processing to create test data 210. For example, the results of the analysis may include individual test failures and a failure profile indicating, for example, numbers and proportion of failures (e.g., see health check failures 504 and health check results 506 of FIG. 5). Each failure listed may be accompanied by a "reason" for the failure, such as an error code produced by the subsystem being tested. In one embodiment, the failure profile is compared to failure profiles of prior candidate evaluations to identify any outliers. Additionally, the distribution of the error codes may be compared to determine if it matches distributions of previous candidate evaluations. In various embodiments, the statistical comparisons may include any statistical algorithm to compare results (e.g., results 206) of one or more candidate evaluations, and may be performed by either a component on a client device or a computing device (e.g., candidate evaluation component 116 or candidate program component 204).

The GUI component 118 may display the test data 210 generated from the analysis of the result 206, and may include, but not be limited to, test completion data (e.g., tests completed normally and partial completion of tests), pass data, and fail data (e.g., which test routines failed) associated with the client devices (e.g., client devices 104S to 104N). Test data 210 may also include receiving a timeout indication from one or more of the plurality of client devices (e.g., from the resident program component 120) when the health-check at the one or more client devices fails to generate result 206 indicating the test failed to complete and return result 206.

In one embodiment, the resident program component 120 monitors the candidate program component 204 while running in the health-check mode. The resident program component 120 may determine the health-check timed out after a timeout threshold and end execution of the candidate program component 204. The resident program component 120 may include the timeout result data (not shown) in the test report 208. The resident program component 120 may also determine the candidate program component 204 has become unstable and encountered and execution issue, such as stop responding to commands or other issue that requires the resident program component 120 to terminate the execution of the candidate program component 204. As with exceeding the timeout threshold or failing to complete within a timeout window, the resident program component 120 may also include termination result data (not shown) in the test report 208.

In one embodiment, based on the analysis results, the candidate evaluation component 116 may communicate to the resident program component 120 an indication to install the candidate program component 204 in a runtime mode for runtime execution. In one embodiment, the candidate program component 204 is a different release or version of the resident program component 120, and after the candidate program component 204 is installed in the runtime mode the resident program component 120 is uninstalled in place of the version corresponding to the candidate program component 204. In various embodiments, the removal of resident program component 120 may be initiated by the candidate program component 204, remotely by the candidate evaluation component 116, or itself.

In various embodiments, a user of computing device 102 may interact with inputs of the GUI to determine which of the client devices 104A to 104N are to receive the indication to install the candidate program in a runtime mode and which of the client devices 104A to 104N that require a modified candidate program to address each system's mode of failure and incompatibility. In another embodiment, the indication to automatically install the candidate program in a runtime mode is transmitted without user intervention based on the results of the analysis by the candidate evaluation component 116. The automated decision to install the candidate program by the content delivery system 200 (e.g., by the candidate evaluation component 116) may be based on one or more criteria, such as a threshold number of passing client device systems, client device type and configuration, which may include platform type (e.g., desktop, mobile), operating system type, security software (e.g., antivirus, firewall), operating system version, processor type, and the like. For example, the candidate evaluation component 116 may include a programmable threshold value that may be set to send an indication to automatically install the candidate program component 204 if the threshold of compatible client devices is greater than fifty percent.

Figure 3:
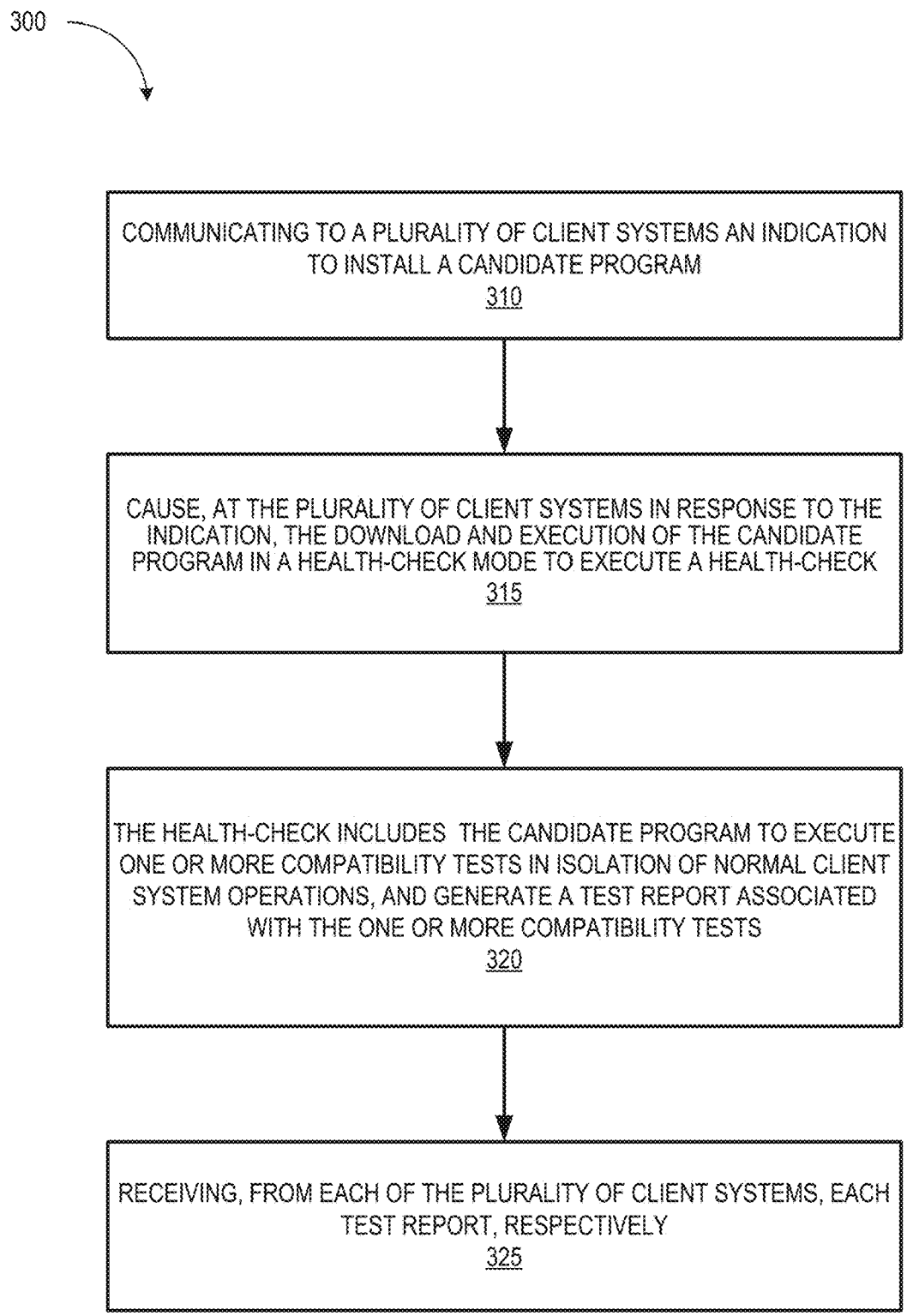
FIG. 3 is a flow diagram of a method to release a candidate program from a content delivery network to client devices, in accordance with some embodiments.

FIG. 3 is a flow diagram of a method 300 to release a candidate program from a content delivery network to client devices, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof on the various described devices (e.g., computing device 102 and client device 104A of FIG. 1). In some embodiments, at least a portion of method 300 may be performed by candidate evaluation component 116 and resident program component 120A to 120N of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Method 300 begins at block 310 where the processing logic communicates to a plurality of client devices an indication to install a candidate program.

At block 315 the processing logic causes, at the plurality of client devices in response to the indication, to download and execute the candidate program in a health-check mode to execute a health-check.

At block 320 the processing logic of the client devices to execute the health-check are further to execute one or more compatibility tests in isolation of normal client device operations, and generate a test report associated with the one or more compatibility test and exiting execution of the candidate program.

At block 325 the processing logic receives, from each of the plurality of client devices, each test report, respectively.

Figure 4:
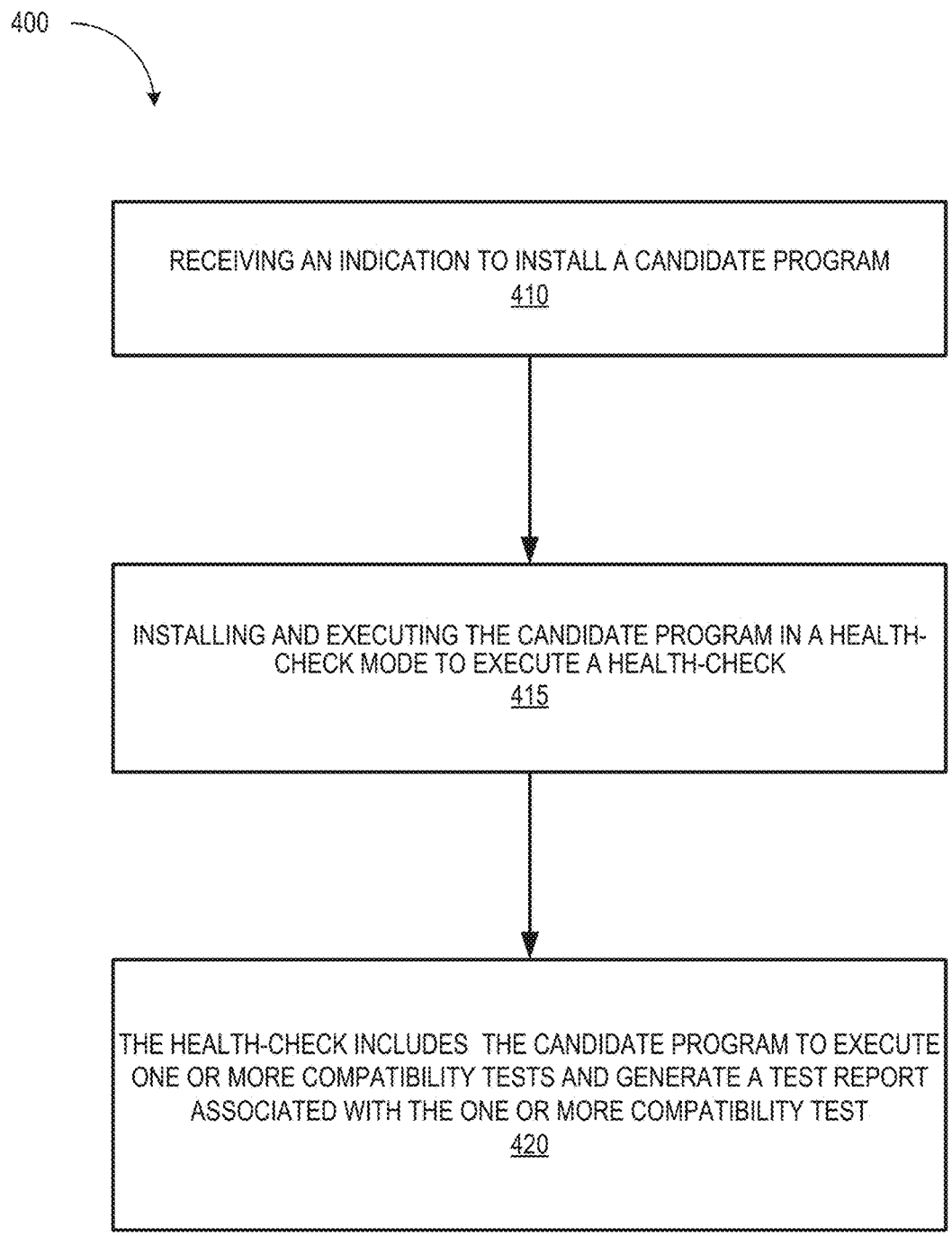
FIG. 4 is a flow diagram of a method to initiate, test and release a candidate program from a content delivery network to client devices, in accordance with some embodiments.

FIG. 4 is a flow diagram of a method 400 to initiate, test and release a candidate program from a content delivery network to client devices, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof on the various described devices (e.g., computing device 102 and client device 104A of FIG. 1). In some embodiments, at least a portion of method 400 may be performed by candidate evaluation component 116 and resident program component 120A to 120N of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410 where the processing logic receives an indication to install a candidate program.

At block 415 the processing logic installs and executes the candidate program in a health-check mode to execute a health-check.

At block 420 the processing logic executes one or more compatibility tests and generates a test report associated with the one or more compatibility test.

Figure 5:
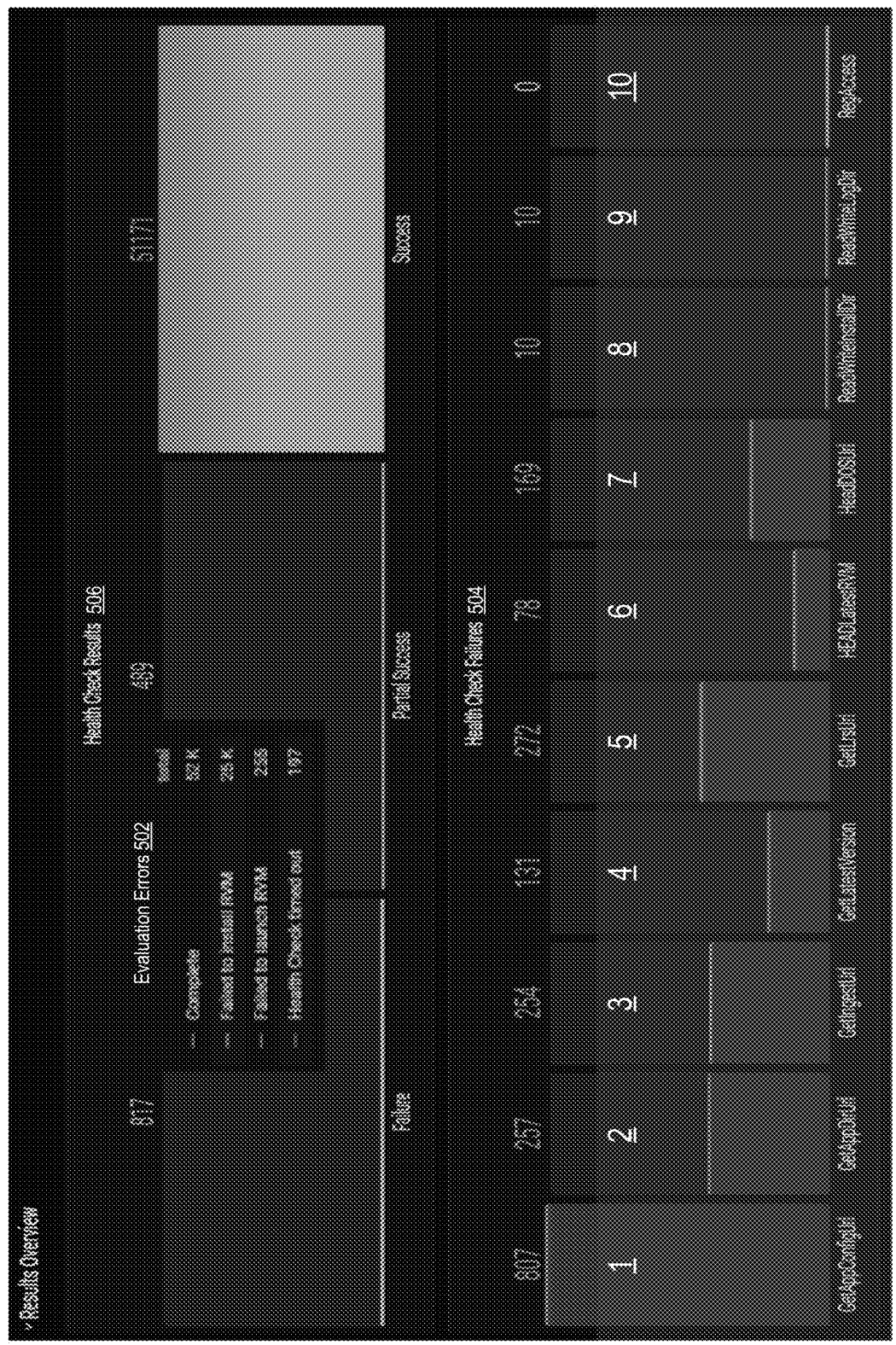
FIG. 5 is a diagram that illustrates an example of a graphical user interface (GUI) for displaying test results of a candidate program release to a multitude of client devices, in accordance with some embodiments.

FIG. 5 is a diagram that illustrates an example of a graphical user interface (GUI) 500 for displaying test results of a candidate program release to a multitude of client devices (e.g., client devices 104a to 104N of FIG. 1) as set forth in embodiments discussed above. In various embodiments, the GUI display may be created and displayed by the content delivery system (e.g., GUI component 118 on computing device 102 of FIG. 1) or other computing device capable of processing the rest results or capable of downloading and displaying the test results. The GUI may include, but is not limited to, one or more graphical representations of test results, such as evaluation errors 502, health check failures 504, and health check results 506. For example, as shown, evaluation errors 502 displays, in part, the number of compatible client devices that successfully completed the tests, the number of incompatible client devices that failed to install the candidate program, the number that failed to launch the candidate program, and the number where the health-check timed out. Health check failures 504 illustrates specifically what portion of the test failed of the completed health-checks. Using this fail data, a developer may make modifications to the candidate program to address the failures associated with the client devices that failed the health check. Health check results 506 shows the total number of compatible client devices where the health-check succeeded, the number of incompatible client devices where the health-check partially succeeded, and the number of incompatible client devices where the health-check failed.

Figure 6:
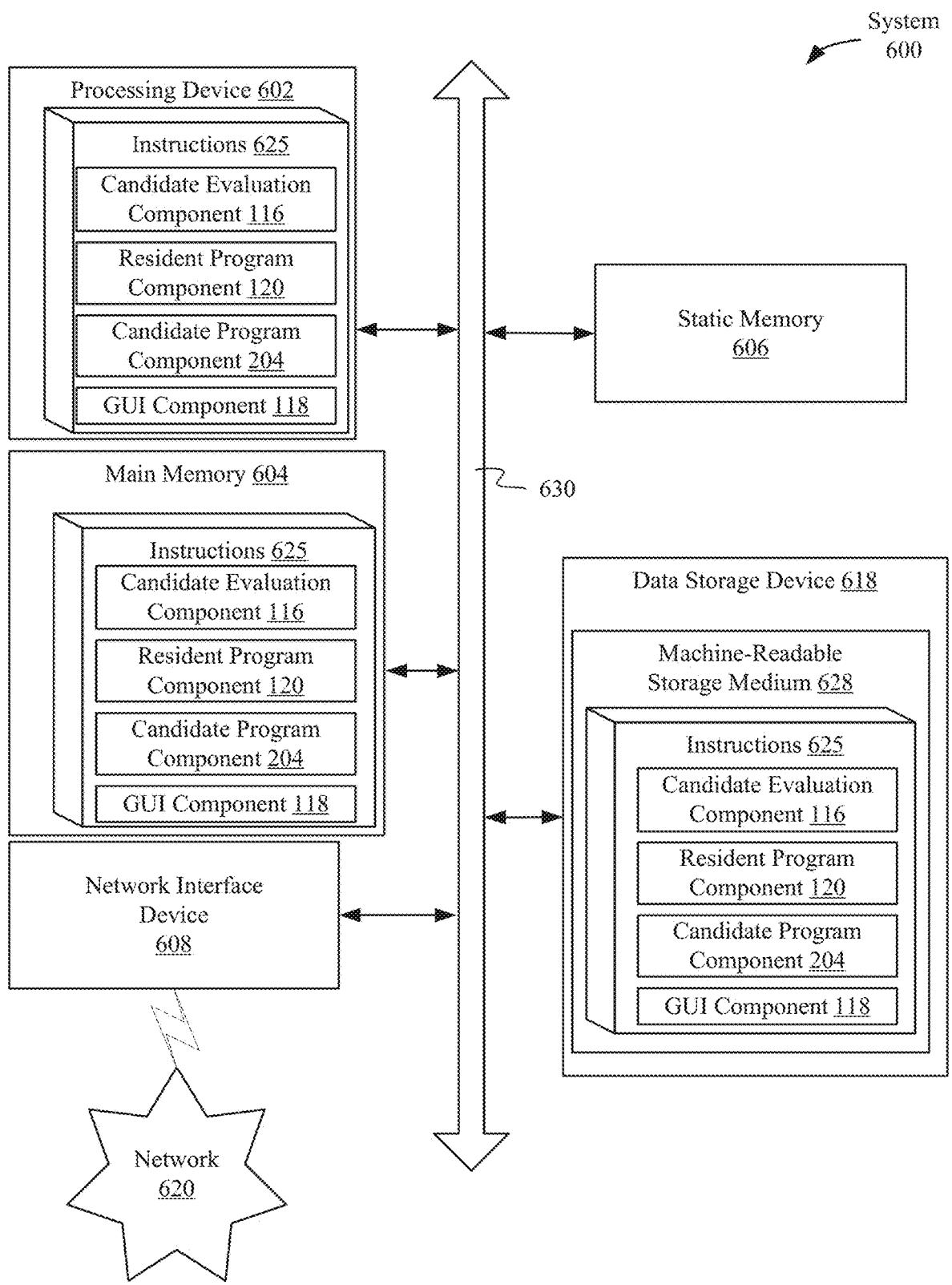
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. Data storage device 618 may include a computer-readable storage medium 628 on which may be stored one or more sets of instructions 625 that may include instructions for a candidate evaluator, resident program, graphical user interface, or candidate program, (e.g., candidate evaluation component 116, resident program component 120A to 120N, GUI component 118, and candidate program component 204 of FIGS. 1 and 2), for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "reading," "routing," "updating," "connecting," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    transmitting via wired or wireless infrastructure to a resident program installed on each of a plurality of client devices, by one or more processors, an indication to install a candidate program, the candidate program comprising a different version of the resident program installed on each of the plurality of client devices;
    causing the resident program included on each of the plurality of client devices, in response to receiving the indication, to download and launch the candidate program in a health-check mode to execute a health-check to determine compatibility of the candidate program with each client device, wherein to execute the health-check at each client device comprises:
        executing, by the candidate program, one or more compatibility tests in background of the resident program running on a same client device as the candidate program, the one or more compatibility tests to determine the compatibility of the candidate program with the same client device, wherein the one or more compatibility tests include testing access to a uniform resource locator comprising an endpoint for license verification; and
        generating, at each of the plurality of client devices, a result associated with the one or more compatibility tests;
    receiving, from each of the plurality of client devices, a test report based on the result, respectively;
    analyzing, by the one or more processors, the test report from each of the plurality of client devices to determine a set of compatible client devices from the plurality of client devices and a set of incompatible client devices from the plurality of client devices; and
    communicating, automatically and without user intervention, to the resident program of each of the compatible client devices an indication that causes installation of the candidate program in a runtime mode when a percentage of compatible client devices exceeds a threshold value.

2. The method of claim 1, further comprising each client device executing the one or more compatibility tests in isolation of normal operation of the client device.

3. The method of claim 1, wherein analyzing each test report comprises:
    identifying, by the one or more processors, a cause of failure from each test report of the set of incompatible client devices;
    generating a failure profile indicating proportions of failures;
    comparing the failure profile to a failure profile of prior candidate evaluations to identifier an outlier client device; and
    generating a graphical user interface to display the cause of failure for one or more of the incompatible client devices and the outlier client device.

4. The method of claim 1, wherein analyzing each test report comprises:
    generating test data based on analysis of each test report; and
    generating a graphical user interface to display the test data associated with each compatible client devices.

5. The method of claim 1, further comprising:
    receiving a timeout indication from one or more of the plurality of client devices when the health-check at the one or more client devices fails to generate a result.

6. The method of claim 1, further comprising:
    receiving an install indication from a client device that the candidate program was automatically installed in the runtime mode in response to releasing the candidate program to the client device.

7. The method of claim 6, further comprising initiating, automatically, removal of the resident program on the client device in response to receiving the install indication from the client device.

8. The method of claim 1, wherein the one or more compatibility tests include testing read/write access to a file system location for storing log files or asset files.

9. A system, comprising:
    a memory; and
    a processing device, operatively coupled to the memory, to:
        transmit via wired or wireless infrastructure to a resident program installed on each of a plurality of client devices, by one or more processors, an indication to install a candidate program, the candidate program comprising a different version of the resident program installed on each of the plurality of client devices;
        cause the resident program included on each of the plurality of client devices, in response to receiving the indication, the plurality of client devices comprising a client device memory and a client processing device, operatively coupled to the client device memory, to:
            download and launch the candidate program in a health-check mode to execute a health-check to determine compatibility of the candidate program with each client device, wherein to execute the health-check each the client processing device further to:
            execute, by the candidate program, one or more compatibility tests in background of the resident program running on a same client device as the candidate program, the one or more compatibility tests to determine the compatibility of the candidate program with the same client device, wherein the one or more compatibility tests include testing access to a uniform resource locator comprising an endpoint for license verification; and
            generate, at each of the plurality of client devices, a result associated with the one or more compatibility tests;
        the processing device further to receive, from each of the plurality of client devices, a test report based on the result;

analyze, by the one or more processors, the test report from each of the plurality of client devices to determine a set of compatible client devices from the plurality of client devices and a set of incompatible client devices from the plurality of client devices; and communicating, automatically and without user intervention, to the resident program of each of the compatible client devices an indication that causes installation of the candidate program in a runtime mode when a percentage of compatible client devices exceeds a threshold value.

10. The system of claim 9, wherein the client processing device is further to execute the one or more compatibility tests in isolation of normal operation of the client device operations.

11. The system of claim 9, wherein the processing device is further to:
identify a cause of failure from each test report of the set of incompatible client devices;
generate a failure profile indicating proportions of failures;
compare the failure profile to a failure profile of prior candidate evaluations to identifier an outlier client device; and
generate a graphical user interface to display the cause of failure for one or more of the incompatible client devices and the outlier client device.

12. The system of claim 9, wherein the processing device is further to:
generate test data based on analysis of each test report; and
generate a graphical user interface to display the test data associated with each compatible client devices.

13. The system of claim 9, wherein the processing device is further to:
receive a timeout indication from one or more of the plurality of client devices when the health-check at the one or more client devices fails to generate a result.

14. The system of claim 9, wherein the processing device is further to:
receive an install indication from a client device that the candidate program was automatically installed in the runtime mode in response to releasing the candidate program to the client device.

15. The system of claim 14, wherein the processing device is further to initiate, automatically, removal of the resident program on the client device in response to the install indication received from the client device.

16. The system of claim 9, wherein the one or more compatibility tests include testing read/write access to a file system location for storing log files or asset files.

17. A method, comprising:
receiving via wired or wireless infrastructure, on one or more processors of a client device executing a resident program installed on the client device, an indication to install a candidate program, the candidate program comprising a different version of the resident program installed on the client device; and
installing and launching the candidate program in a health-check mode to execute a health-check to determine compatibility of the candidate program with the client device, wherein executing in the health-check mode comprises:
executing, by the candidate program to generate a result, one or more compatibility tests in background of the resident program running on the client device, the one or more compatibility tests to determine the compatibility of the candidate program with the client device, wherein the one or more compatibility tests include testing access to a uniform resource locator comprising an endpoint for license verification;
generating, at the client device, a test report based on the result associated with the one or more compatibility tests;
uploading via the wired or the wireless infrastructure the test report to a content delivery system; and
when the content delivery system determines a set of compatible client devices includes the client device and the set of compatible client devices exceeds a threshold percentage of compatible client devices:
receiving, automatically and without user interaction at the resident program, an indication to install the candidate program in a runtime mode,
installing the candidate program in the runtime mode in response to the indication received at the resident program;
transmitting an install indication to the content delivery system in response to successfully installing the candidate program in the runtime mode, and
uninstalling the resident program in response to successfully installing the candidate program in the runtime mode.

18. The method of claim 17, further comprising:
monitoring, by the one or more processors, the candidate program running in the health-check mode; and
ending execution of the candidate program when it is determined the candidate program is unstable.

19. The method of claim 18, further comprising:
ending execution of the candidate program when it is determined the candidate program failed to complete execution of the health-check by exceeding a timeout threshold.

20. The method of claim 17, further comprising the client device executing the one or more compatibility tests in isolation with respect to normal operation of the client device.

* * * * *